March 4, 1952 L. E. WOOD 2,587,946
METEOROLOGICAL APPARATUS
Filed Oct. 17, 1946
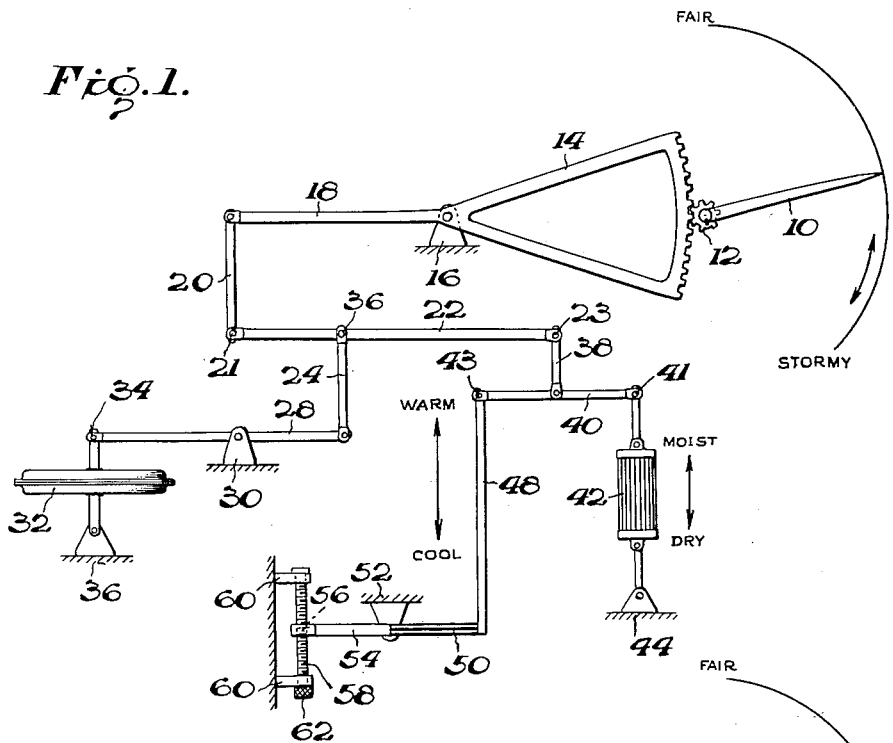
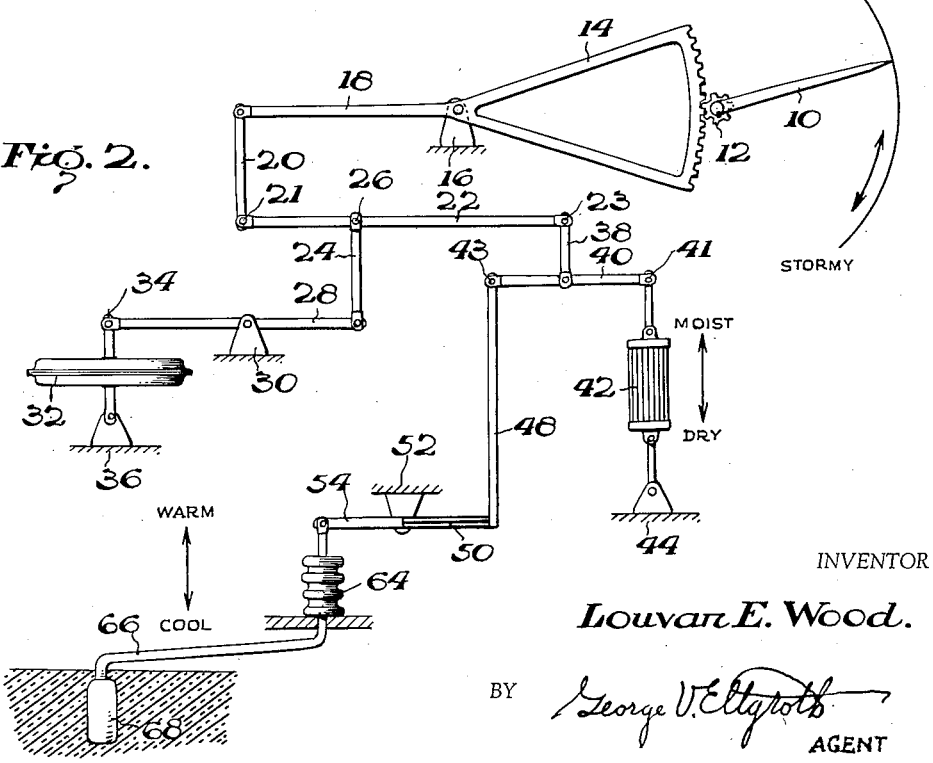
INVENTOR
Louvan E. Wood.
BY George V. Eltgroth
AGENT Patented Mar. 4, 1952

2,587,946

UNITED STATES PATENT OFFICE 2,587,946

METEOROLOGICAL APPARATUS

Louvan E. Wood, Baltimore, Md., assignor to Bendix Aviation Corporation, Baltimore, Md., a corporation of Delaware Application October 17, 1946, Serial No. 703,918

5 Claims. (Cl. 73—170)

This invention relates to meteorological indicators and, more particularly, to a meteorological indicator adapted to provide local weather forecasts.

It is well known that there exists a relationship between the atmospheric pressure and impending changes in the weather, which relationship has often been availed of by amateur meteorologists by using an aneroid barometer with a dial calibrated to indicate impending weather changes. The accuracy of this type of forecasting is materially increased by further taking into account variations in the amount of moisture carried by the air. This characteristic is customarily designated by meteorologists the specific humidity of the air and indicates the moisture content per unit weight of the surrounding atmosphere. Specific humidity is what is frequently termed a conservative characteristic of the air, which is to say that it is substantially unaffected by short period temperature variations. When taken into account, in addition to the barometric pressure, far more accurate indications of impending weather changes are secured.

Accordingly, it is a primary object of the invention to provide new and novel apparatus for automatically forecasting weather conditions.

It is a further object of the invention to provide a new and novel weather forecaster in which barometric pressure controlled indications are modified in accordance with the specific humidity obtaining at the place of observation.

It is another object of the invention to provide new and novel meteorological apparatus combining specific humidity indications with barometric pressure indications in which the reference specific humidity level is varied with the season.

Other objects and advantages of the invention will in part be related and in part be obvious when the following specification is read in conjunction with the drawings in which:

Fig. 1 is a schematic diagram of an improved meteorological indicator combining barometric pressure indications and specific humidity indications;

Fig. 2 is a schematic diagram of a similar apparatus provided with automatic compensations for seasonal variations.

Referring now to Fig. 1, an indicating pointer 10 is carried by a shaft to which there is affixed a pinion 12 meshing the toothed sector 14 adapted for rotation about the fixed pivot 16. As the movement of the sector 14 rotates the pinion 12, the arm 10 is caused to move over an associated graduated scale. A lever arm 18 extends from the pivoted end of sector 14 and is pivotally joined with an intermediate link 20 hinged at its lower end to an arm 22. An aneroid coupling arm 24 extends downwardly from the hinge 26 attached to the arm 22 and is pivoted at its lower end to the aneroid beam 28. The beam 28 is pivoted at an intermediate point 30 and linked to an evacuated cell 32 at its remote end 34. The other surface of the aneroid cell 32 is secured to a fixed abutment at 36.

The end of arm 22 connects through the specific humidity link 38 to an intermediate point on the specific humidity beam 40, both points of connection 23, 45 being hinged for free rotation. A relative humidity responsive hair element 42 may be connected intermediate one end of the specific humidity beam 40 and a fixed abutment 44.

The other end of the specific humidity beam 40 is pivoted to the temperature link 48 pivotally secured to one end of a bimetal element 50 pivoted at a fixed abutment 52. An arm 54 of homogeneous material may be butt-welded to the pivoted end of bimetal 50 and extends therefrom. The free end of the arm 54 is apertured and tapped at 56 to receive an adjusting screw 58 supported in two fixed lugs 60 and having a milled head 62 to permit ready rotation of the screw 58 for adjustment of the compensating bimetal. The operation of this apparatus is as follows:

Upon a decrease in atmospheric pressure, the aneroid cell 32 expands, driving the beam 28 clockwise to pull the arm 22 down, this arm rotating about the point 23 which, under the assumed conditions of no humidity or temperature change, has not moved from its original position. The pivot end 21 is thus moved downwardly to rotate the sector 14 counterclockwise causing clockwise rotation of the pointer 10 over the associated scale. If the relative humidity now increases while the temperature and pressure remain constant, the hair assembly 42 stretches moving the pivot point 23 upward to rotate the beam 22 counterclockwise about the pivot point 26, similarly driving the sector 14 in a counterclockwise direction resulting in further clockwise rotation of the pointer 10.

During the passage of the day with resultant cyclic variations in the temperature of the earth's surface due to the presence and absence of solar radiation, the specific humidity tends to remain substantially constant although the relative humidity may vary widely because of the differing air temperatures. These changes in relative humidity caused by diurnal temperature variations are without major meteorological significance in the forecasting of local weather conditions so long as the specific humidity remains constant. The effect of such temperature variations is minimized or neutralized by the bimetal 50 moving the pivot point 43 upwardly when the bimetal 50 is warm and downwardly during the cooler portions of the day. Thus movements of the bimetal 50 serve to very nearly compensate the changes in the length of the hair element 42 occurring in respect to purely temperature induced relative humidity changes.

It has been found that the significance of a given level of specific humidity changes with the season, for a given specific humidity during the winter months may correspond to a rather high moisture content in the atmosphere, relatively speaking, while the same amount in the summer would correspond to a rather dry day. It, accordingly, becomes desirable to introduce some form of seasonal compensation. This is done in the apparatus of Fig. 1 by rotation of the knurled knob 62 to move the free end of the coupling bar 54 and introduce different reference positions for the bimetal 50. The apparatus of Fig. 2 incorporates the further refinement of automatically setting in the proper changes in specific humidity reference levels for the various seasons. The apparatus up to the pivot point 52 after the bar 54 is as previously described, but the free end of the bar 54 is here linked to the bellows assembly 64 connected by a capillary line 66 to a bulb 68 buried sufficiently deep in the earth to prevent substantial influence of the bulb temperature by hour to hour variations in surface temperature but yet to respond faithfully to changes in outside temperature extending over weeks of time. This temperature may be conveniently referred to as the seasonal temperature. An increase in seasonal temperature moves the free end of bar 54 upward to reset the reference point of bimetal 50 downwardly, insuring that only diurnal temperature differentials are effective in influencing the position of the indicating pointer 10. The utility and application of the apparatus are eminently apparent from the foregoing. It is further clear that the pointer 10 might be provided with contacts and used to effect a control operation in response to changes in weather conditions. Where the term "indicating means" is employed it is intended to embrace within its scope such a control function.

Although the bulb 68 has been indicated as buried in the earth to secure a sufficiently great time constant, it is obvious that other forms of thermal insulation may be equally advantageously employed so long as the time constant is sufficiently extended to prevent substantial response to temperature changes occurring within a 24-hour interval.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalents of the claims are therefore intended to be embraced thereby.

What is claimed and desired to be secured by United States Letters Patent is:

1. In apparatus responsive to changes in ambient atmospheric conditions, an arm, a first driving link pivotally connected at one extremity thereof to said arm intermediate its extremities, a second driving link pivotally connected at one extremity thereof to said arm at one extremity thereof, pressure responsive means, a first beam pivotally supported intermediate its extremities and having one extremity connected to said pressure responsive means and having the other extremity pivotally connected to the other extremity of said first driving link, relative humidity responsive means, temperature responsive means, a second beam pivotally connected intermediate its extremities to the other extremity of said second driving link and having one extremity pivotally connected to said relative humidity responsive means and having the other extremity pivotally connected to said temperature responsive means, and indicating means driven by said arm.

2. In apparatus responsive to changes in ambient atmospheric conditions, an arm, a first driving link pivotally connected at one extremity thereof to said arm intermediate its extremities, a second driving link pivotally connected at one extremity thereof to said arm at one extremity thereof, pressure responsive means, a first beam pivotally supported intermediate its extremities and having one extremity connected to said pressure responsive means and having the other extremity pivotally connected to the other extremity of said first driving link, relative humidity responsive means, temperature responsive means, said temperature responsive means having a time constant rendering it substantially non-responsive to diurnal temperature variations, a second beam pivotally connected intermediate its extremities to the other extremity of said second driving link and having one extremity pivotally connected to said relative humidity responsive means and having the other extremity pivotally connected to said temperature responsive means, and indicating means driven by said arm.

3. In apparatus responsive to changes in ambient atmospheric conditions, an arm, a first driving link pivotally connected at one extremity thereof to said arm intermediate its extremities, a second driving link pivotally connected at one extremity thereof to said arm at one extremity thereof, pressure responsive means, a first beam pivotally supported intermediate its extremities and having one extremity connected to said pressure responsive means and having the other extremity pivotally connected to the other extremity of said first driving link, relative humidity responsive means, temperature responsive means, a second beam pivotally connected intermediate its extremities to the other extremity of said second driving link and having one extremity pivotally connected to said relative humidity responsive means and having the other extremity pivotally connected to said temperature responsive means, said first beam moving in a predetermined direction for a decrease in pressure, said second beam moving in a predetermined direction for an increase in relative humidity and/or an increase in temperature, said arm moving in a predetermined direction for a decrease in pressure and/or an increase in relative humidity and/or an increase in temperature, and indicating means driven by said arm.

4. In apparatus responsive to changes in ambient atmospheric conditions, an arm, a first driving link pivotally connected at one extremity thereof to said arm intermediate its extremities, a second driving link pivotally connected at one extremity thereof to said arm at one extremity thereof, pressure responsive means, a first beam pivotally supported intermediate its extremities and having one extremity connected to said pressure responsive means and having the other extremity pivotally connected to the other extremity of said first driving link, relative humidity responsive means, temperature responsive means, a second beam pivotally connected intermediate its extremities to the other extremity of said second driving link and having one extremity pivotally connected to said relative humidity responsive means and having the other extremity pivotally connected to said temperature responsive means, said first beam moving in a predetermined direction for a decrease in pressure, said second beam moving in a predetermined direction for an increase in relative humidity and/or an increase in temperature, said arm moving in a predetermined direction for a decrease in pressure and/or an increase in relative humidity and/or an increase in temperature, means to move said second beam independently of changes in temperature and/or relative humidity, said means comprising manually adjustable means for moving said temperature responsive means, and indicating means driven by said arm.

5. In apparatus responsive to changes in ambient atmospheric conditions, an arm, a first driving link pivotally connected at one extremity thereof to said arm intermediate its extremities, a second driving link pivotally connected at one extremity thereof to said arm at one extremity thereof, pressure responsive means connected to said first driving link at the other extremity thereof, relative humidity responsive means, temperature responsive means, a beam pivotally connected intermediate its extremities to the other extremity of said second driving link and having one extremity pivotally connected to said relative humidity responsive means and having the other extremity pivotally connected to said temperature responsive means, and indicating means driven by the other extremity of said arm, said indicating means moving in a predetermined direction in response to decreasing pressure, increasing temperature, and increasing relative humidity.

LOUVAN E. WOOD.

REFERENCES CITED

The following references are of record in the file of this patent:

UNITED STATES PATENTS

| Number | Name | Date |
| --- | --- | --- |
| 1,946,702 | Lanquetin | Feb. 13, 1934 |
| 2,071,904 | Shurtleff | Feb. 23, 1937 |
| 2,106,083 | Chappell et al. | Jan. 18, 1938 |
| 2,156,868 | Reynolds | May 2, 1939 |
| 2,274,290 | Barnhart | Feb. 24, 1942 |
| 2,294,540 | Edwards | Sept. 1, 1942 |
| 2,347,160 | Wallace | Apr. 18, 1944 |

FOREIGN PATENTS

| Number | Country | Date |
| --- | --- | --- |
| 368,701 | Italy | Feb. 28, 1939 |

OTHER REFERENCES

Ziebolz, Publication entitled Analyses and Design of Translator Chains, vol. 2, Fig. 269. Published by Askania Regulator Co., Chicago, Ill.